US009442761B2

(12) United States Patent
Yagura

(10) Patent No.: US 9,442,761 B2
(45) Date of Patent: Sep. 13, 2016

(54) SEQUENCE CONTROLLER

(75) Inventor: Masaki Yagura, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 582 days.

(21) Appl. No.: 13/191,804

(22) Filed: Jul. 27, 2011

(65) Prior Publication Data

US 2012/0029657 A1 Feb. 2, 2012

(30) Foreign Application Priority Data

Jul. 27, 2010 (JP) ................................. 2010-168218

(51) Int. Cl.
*G06F 9/44* (2006.01)
*G06F 9/48* (2006.01)
*G05B 19/05* (2006.01)

(52) U.S. Cl.
CPC ........... *G06F 9/4887* (2013.01); *G05B 19/056* (2013.01); *G05B 2219/25367* (2013.01)

(58) Field of Classification Search
CPC .................................................... G06F 9/4887
USPC ........................................................ 717/104
See application file for complete search history.

(56) References Cited

U.S. PATENT DOCUMENTS

| 4,722,043 A | 1/1988 | Nagamine et al. | |
|---|---|---|---|
| 8,584,122 B2* | 11/2013 | Ferrandiz ....................... | 718/101 |
| 2002/0069400 A1* | 6/2002 | Miloushev et al. ........... | 717/108 |
| 2002/0120661 A1* | 8/2002 | Binns et al. ................... | 709/102 |
| 2005/0102413 A1* | 5/2005 | Binns .................. | H04L 43/0852 709/232 |
| 2006/0112377 A1 | 5/2006 | Nacul et al. | |
| 2007/0185832 A1* | 8/2007 | Kriebel ............................ | 707/3 |
| 2010/0088706 A1* | 4/2010 | Dong .................... | G06F 9/4887 718/103 |

FOREIGN PATENT DOCUMENTS

| JP | 8-076836 A | 3/1996 |
|---|---|---|
| JP | 2007-140655 A | 6/2007 |
| JP | 2009-110455 A | 5/2009 |

OTHER PUBLICATIONS

European Search Report dated Oct. 24, 2011, issued in corresponding European Patent Application No. 11175651.6.
Isovie, Damir et al.; "Handling mixed sets of tasks in combined offline and online scheduled real-time systems"; Real-Time Systems, Kluwer Academic Publishers, BO, vol. 43, No. 3, Aug. 28, 2009, pp. 296-325, XP019753866.

(Continued)

*Primary Examiner* — Wei Zhen
*Assistant Examiner* — Lanny Ung
(74) *Attorney, Agent, or Firm* — Westerman, Hattori, Daniels & Adrian, LLP

(57) ABSTRACT

A sequence controller includes a periodic execution type sequence control module configured to execute each regular processing function block in a predetermined control period, an irregular processing function block storage configured to hold an irregular processing function block generated by a user, and a time-sharing execution type sequence control module configured to execute the irregular processing function block called from the irregular processing function block storage in free time of the control period. The periodic execution type sequence control module is configured to call the irregular processing function block from the irregular processing function block storage and to execute the irregular processing function block in the control period.

19 Claims, 9 Drawing Sheets

(56) References Cited

OTHER PUBLICATIONS

Lehoczky, John P. et al.; "An Optimal Algorithm for Scheduling Soft-Aperiodic Tasks in Fixed-Priority Preemptive Systems"; Proceedings of the Real Time Systems Symposium. Phoenix, Dec. 2-4, 1992; [Proceedings of the Real Time Systems Symposium], Los Alamitos, IEEE Comp. Soc Press, US, vol.-, Dec. 2, 1992), pp. 110-123, XP010031291.(cited in European Search Report dated Oct. 24, 2011).

Lehoczky, John P. et al.; "Enhanced Aperiodic Responsiveness in Hard Real-Time Environments"; Proceedings of the Real Time Systems Symposium. San Jose, Dec. 1-3, 1987; [Proceedings of the Real Time Systems Symposium], Washington, IEEE Comp. Sec. Press, US, vol. Symp. 8, Jan. 1, 1987, pp. 261-270, XP000567364.

Centum VP Reference SEBOL 5th Edition, Document No. IM 33M01A30-40E, Yokogawa Electric Corporation and the English translation thereof. Parts 1-20.

Chinese Office Action dated Sep. 22, 2013, issued in corresponding Chinese Patent Application No. 201110212243.8, w/ English translation (12 pages).

Centum VP Reference SEBOL 5th Edition, Document No. IM 33M01A30-40E, Yokogawa Electric Corporation and the English translation thereof. Parts 1-20 , 2008.

\* cited by examiner

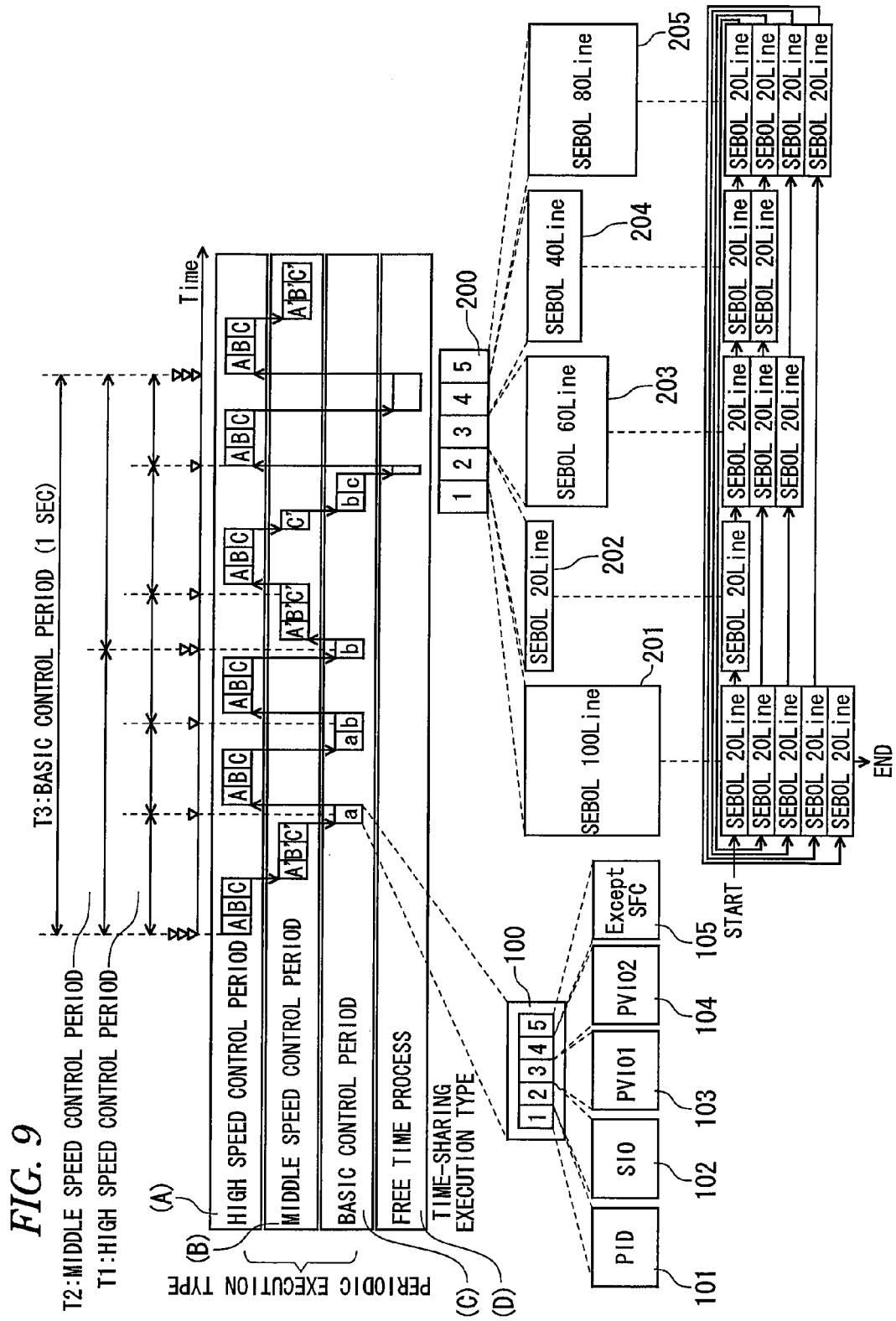

SEQUENCE CONTROLLER

TECHNICAL FIELD

The present disclosure relates to a sequence controller having a periodic execution type sequence control module which executes a regular processing function block in a predetermined control period, an irregular function block storage which holds an irregular function block generated by a user, and a time-sharing execution type sequence control module which executes the irregular function block called from the irregular function block storage in free time of the control period.

RELATED ART

FIG. 7 is a functional block diagram showing an example of configuration of a process control system having a sequence controller according to the related art. A control station 10 which forms a distributed control system is equipped with a control application 20 and a sequence controller 30.

The control station 10 communicates with a higher-level device 50 forming a distributed control system through a control bus 40, communicates with field devices 71, 72, . . . 7N through a field bus 60 and controls these devices.

An engineering station 80 which communicates with the control station 10 and the higher-level device 50 is connected on the control bus 40 so that a builder 81 generates an operation/monitoring application operating on the higher-level device 50, a control application 20 operating on the control station 10 and a sequence function block operating on the sequence controller 30 and the higher-level device 50 and the control station 10 download these applications.

The sequence controller 30 has a timer control module 31, an event control module 32, a periodic execution type sequence control module 33, a time-sharing execution type sequence control module 34, and an irregular processing function block storage 35. The sequence controller 30 executes registered function blocks in accordance with execution order or processing priority prescribed on a table.

The event control module 32 requests the periodic execution type sequence control module 33 and the time-sharing execution type sequence control module 34 to execute predetermined sequence control based on the sequence execution order or processing priority at event timing notified by the timer control module 31.

The periodic execution type sequence control module 33 executes a regular processing function block in a predetermined control period. Although the regular processing function block has a processing function which is so fixed that a given regular process can be executed at a high speed, the regular processing function block does not support user's customization.

The time-sharing execution type sequence control module 34 executes an irregular function block called from the irregular processing function block storage 35 by using free time in the control period. The irregular processing function block can be customized freely by the user through the builder 81, downloaded into the irregular processing function block storage 35, and called and executed by the time-sharing execution type sequence control module 34.

The regular processing function block executed surely in a predetermined control period controls a sequence which performs processing determined periodically whereas the irregular processing function block controls a sequence which is so low in temporal restriction so that free time in the control period can be used and which needs to be customized freely.

The irregular processing function block is hereinafter referred to as SEBOL (SEquence and Batch Oriented Language) function block. SEBOL is a programming language which has characteristic specialized in batch control in addition to operation of a general programming language usually used.

FIG. 8 is a functional block diagram for explaining operation of an execution link generating module in a sequence controller according to the related art. An engineer writes an execution sequence of regular processing function blocks (PID, SIO, PVI01, PVI02) and SEBOL function blocks (SEBOL01, SEBOL02) on an execution sequence definition screen 91.

The engineer can further select componentized function blocks from a component palette (not shown) or the like and pastes the selected componentized function blocks on a control drawing screen 92 so that the selected componentized function blocks are written in order of execution to thereby form a sequence.

The engineer delivers the contents written on the control drawing screen 92 to the execution link generating module 93 so that the execution link generating module 93 processes the contents to thereby generate a periodic execution link 94 and a time-sharing execution link 95. In the periodic execution link 94, an execution sequence of the regular processing function blocks (PID, SIO, PVI01, PVI02) to be processed by the periodic execution type sequence control module 33 is prescribed. In the time-sharing execution link 95, an execution sequence of SEBOL function blocks (SEBOL01, SEBOL02) to be processed by the time-sharing execution type sequence control module 34 is prescribed.

FIG. 9 is a time chart for explaining a flow of sequence processing executed by the sequence controller according to the related art. The periodic execution type sequence control module 33 performs execution by using at least one of a basic control period, a middle speed control period and a high speed control period. The middle speed control period and the high speed control period are rapider than the basic control period.

In the sequence controller 30, a plurality of program units perform processing in accordance with their processing priorities. The term "program units" used herein means programs to be executed in accordance with the high speed control period T1, the middle speed control period T2 and the basic control period T3 (e.g. 1 second) respectively.

In the high speed control period T1 shown in (A) of FIG. 9, regular processing function blocks A, B and C are executed periodically. In the middle speed control period T2 shown in (B) of FIG. 9, regular processing function blocks A', B' and C' are executed periodically. In the basic control period T3 shown in (C) of FIG. 9, regular processing function blocks a, b and c are executed periodically.

Each of program units of the high speed, middle speed and basic control periods is composed of control drawings (92 in FIG. 8). For example, a control drawing 100 of the regular processing function block a to be executed in the basic control period is composed of function blocks 101 to 105.

Function blocks of each control period execute periodically determined processing respectively. The current processing is interrupted when processing timing of a function block having higher priority has come before completion of the processing. The interrupted processing is restarted after execution of higher-priority processing. Interruption of processing is performed in one of boundaries between function blocks (e.g. 101 to 105).

(D) of FIG. 9 shows a free time process using free time produced between regular processing function blocks executed in each of the high speed, middle speed and basic control periods. The free time process is executed with the lowest priority in program units at such timing that there are no regular processing function blocks operating in the high speed, middle speed and basic control periods.

Each program unit of free time processing is composed of function blocks 200. Each function block is composed of SEBOL function blocks each having lines in the programming language.

Each SEBOL function block is executed not by function block but by unit of SEBOL lines (e.g. 20 lines) forming the function block. After execution of one unit of SEBOL 20 lines, a next unit of SEBOL 20 lines of the function block is executed successively to thereby advance processing.

Such processing that a predetermined quantity of processing is to be executed at regular intervals (other blocks than SEBOL function blocks) is executed in the high speed, middle speed and basic control periods, whereas processing low in temporal restriction (SEBOL function blocks) is executed in the free time processing. The free time processing can be interrupted in each boundary between adjacent units of SEBOL 20 lines.

PRIOR TECHNICAL DOCUMENT

Patent Document

[Patent Document 1] JP-A-08-076836

Non-Patent Document

[Non-Patent Document 1] CENTUM VP Reference SEBOL Edition, Document No. IM 33M01A30-40, Yokogawa Electric Corporation The degree of freedom in user's writing and setting each SEBOL function block is so high that the processing time of the SEBOL function block varies widely. For this reason, the related art is provided on the assumption that the SEBOL function block is executed in a free time processing and when the whole of the SEBOL function block cannot be processed completely in the free time processing, the remaining processing is carried over to a free time processing of the next basic period. This has been regarded as a merit.

On the other hand, processing load in the high speed, middle speed and basic control periods is so heavy that there is a possibility that processing may be disabled for a long time when there is no free time existed. There is a problem that execution cannot be warranted when periodically determined processing is desired to be performed in the SEBOL function block.

SUMMARY

Exemplary embodiments of the present invention provide a sequence controller which makes it possible to operate SEBOL function blocks in a control period in which a periodic execution type sequence control module executes regular processing function blocks.

A sequence controller according to an exemplary embodiment of the invention, comprises:

a periodic execution type sequence control module configured to execute each regular processing function block in a predetermined control period;

an irregular processing function block storage configured to hold an irregular processing function block generated by a user; and a time-sharing execution type sequence control module configured to execute the irregular processing function block called from the irregular processing function block storage in free time of the control period, wherein the periodic execution type sequence control module is configured to call the irregular processing function block from the irregular processing function block storage and to execute the irregular processing function block in the control period.

The periodic execution type sequence control module may be configured to perform execution in at least one of a basic control period, a middle speed control period and a high speed control period, the middle speed control period and the high speed control period being rapider than the basic control period.

The irregular processing function block may be executed in accordance with each program unit having a predetermined number of lines, and switching from the irregular processing function block called and executed by the periodic execution type sequence control module in the control period to the regular processing function block may be executed after completion of processing of the last line of the program unit.

The irregular processing function block called and executed by the periodic execution type sequence control module in the control period may be formed so that repeated processing of the irregular processing function block is limited to one loop in the basic control period.

The irregular processing function block called and executed by the periodic execution type sequence control module in the control period may be formed so that processing of the irregular processing function block is interrupted in the basic control period when processing of jumping to a forward designated address is performed.

According to the embodiment of the invention, the following effects can be expected.

(1) Periodic execution type SEBOL used when periodically determined processing is to be performed on SEBOL function blocks can be provided as a new execution form in addition to the existing time-sharing execution type SEBOL used when temporal restriction is so low that there are a lot of processing contents in SEBOL function blocks.

A user can select one from the two execution forms of time-sharing execution type SEBOL and periodic execution type SEBOL in accordance with requirements of process control, so that the general purpose of SEBOL function blocks can be enhanced.

BRIEF DESCRIPTION OF THE DRAWINGS

FIG. 9 is a time chart for explaining a flow of sequence processing executed by the sequence controller according to the related art.

DETAILED DESCRIPTION

Figure 1:
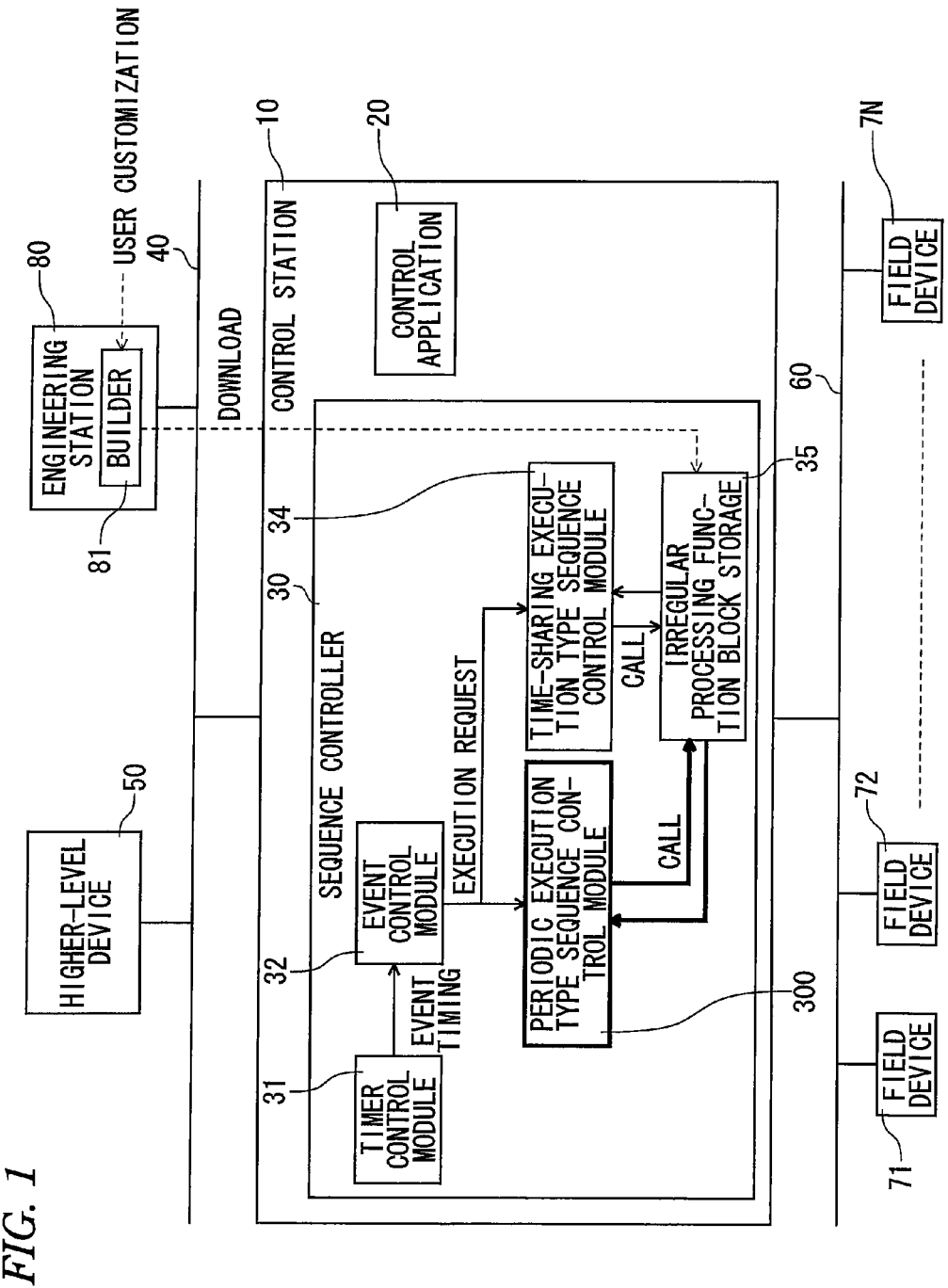
FIG. 1 is a functional block diagram showing an example of a process control system having a sequence controller according to an embodiment of the invention.

The invention will be described below in detail with reference to the drawings. FIG. 1 is a functional block diagram showing an example of a process control system having a sequence controller according to an embodiment of the invention. The same parts as those in the background-art configuration described with reference to FIG. 7 are referred to by the same numerals and description thereof will be omitted.

Figure 7:
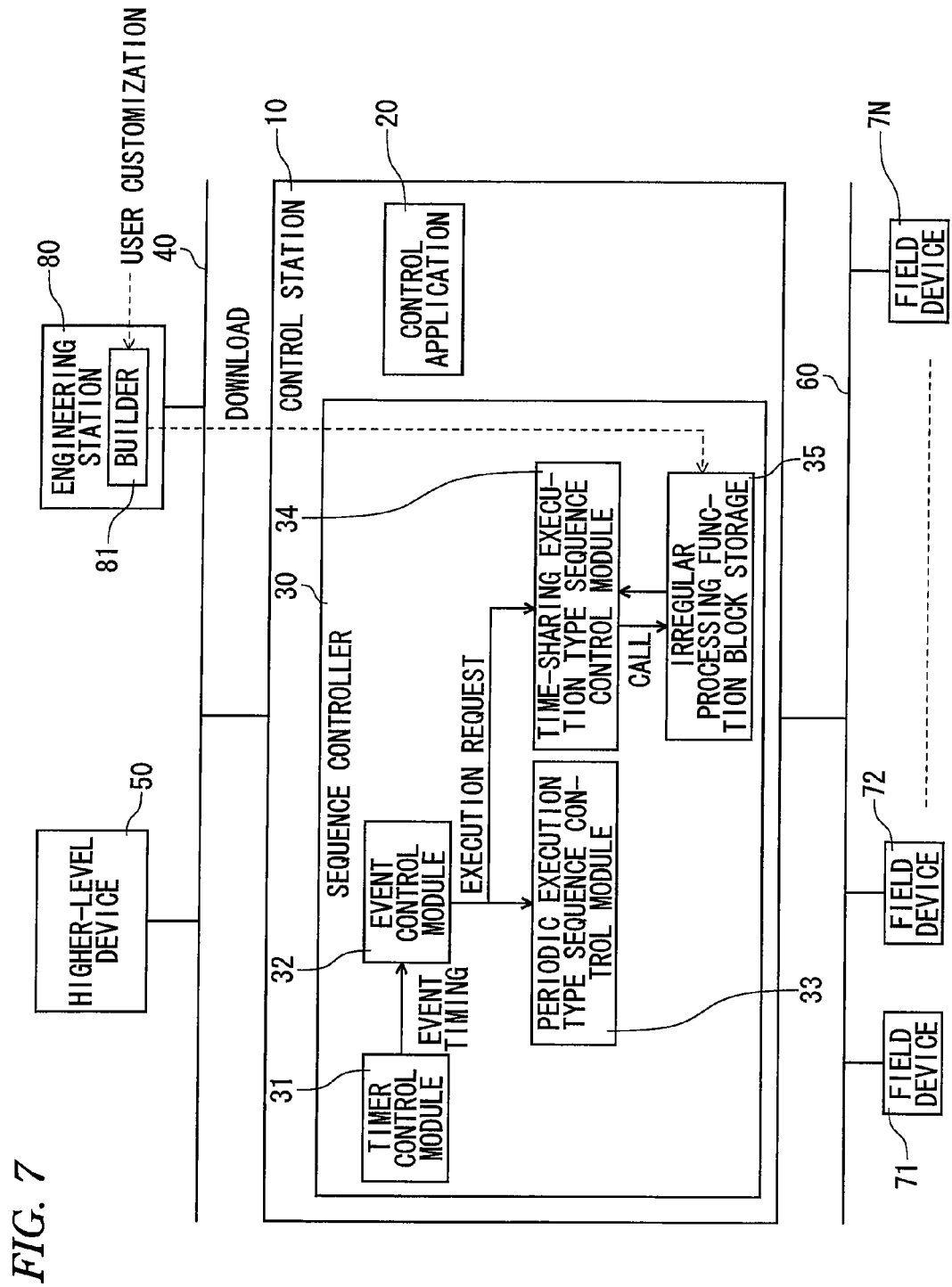
FIG. 7 is a functional block diagram showing an example of configuration of a process control system having a sequence controller according to the related art.

In FIG. 1, a characteristic portion of the invention added to the configuration according to the related art shown in FIG. 7 is configuration in which a periodic execution type sequence control module 300 can access an irregular processing function block storage 35 to call an SEBOL function block stored in the irregular processing function block storage 35 and execute the SEBOL function block.

Figure 2:
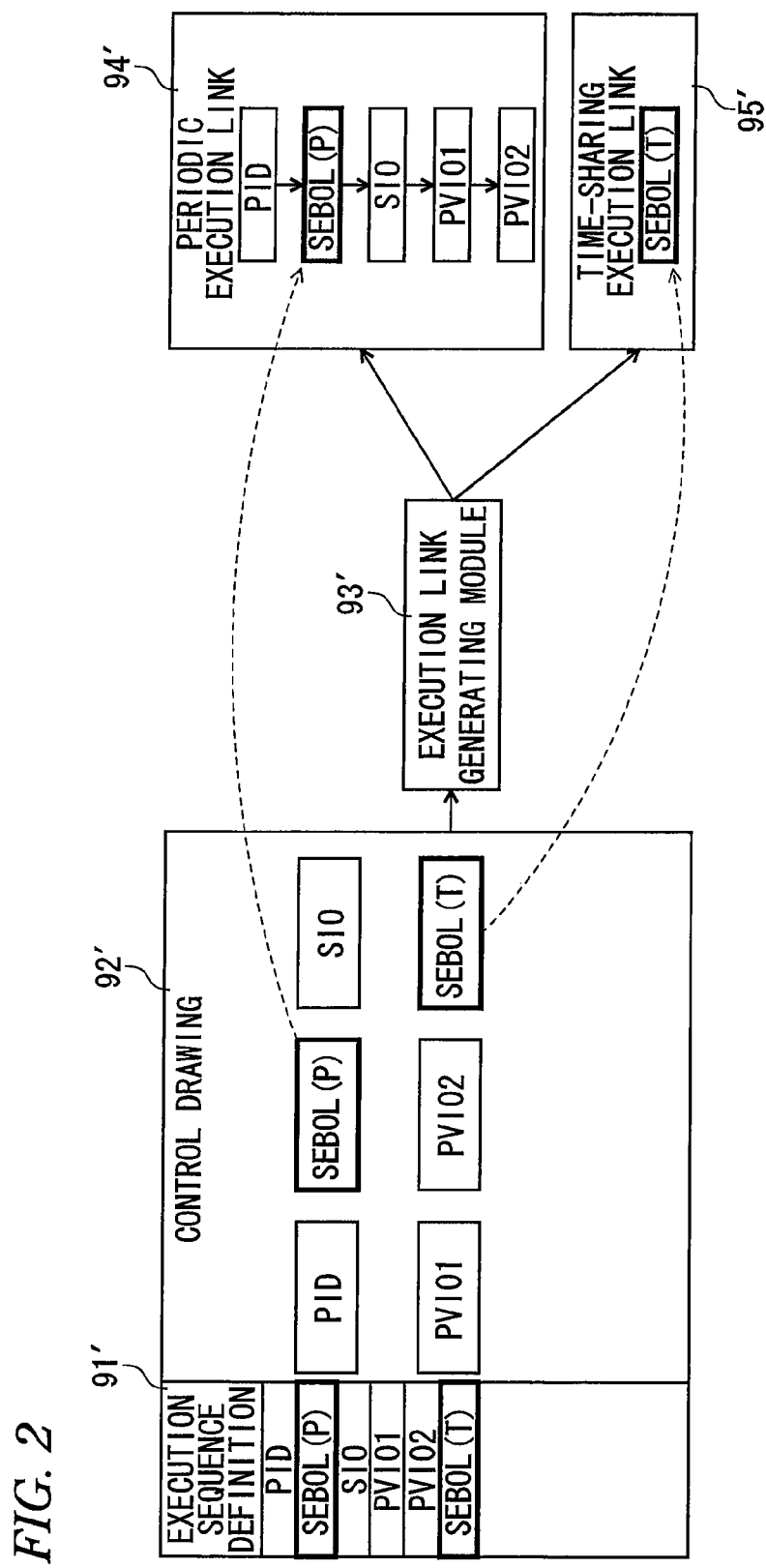
FIG. 2 is a functional block diagram for explaining operation of an execution link generating module in the sequence controller according to the embodiment of the invention.
Figure 8:
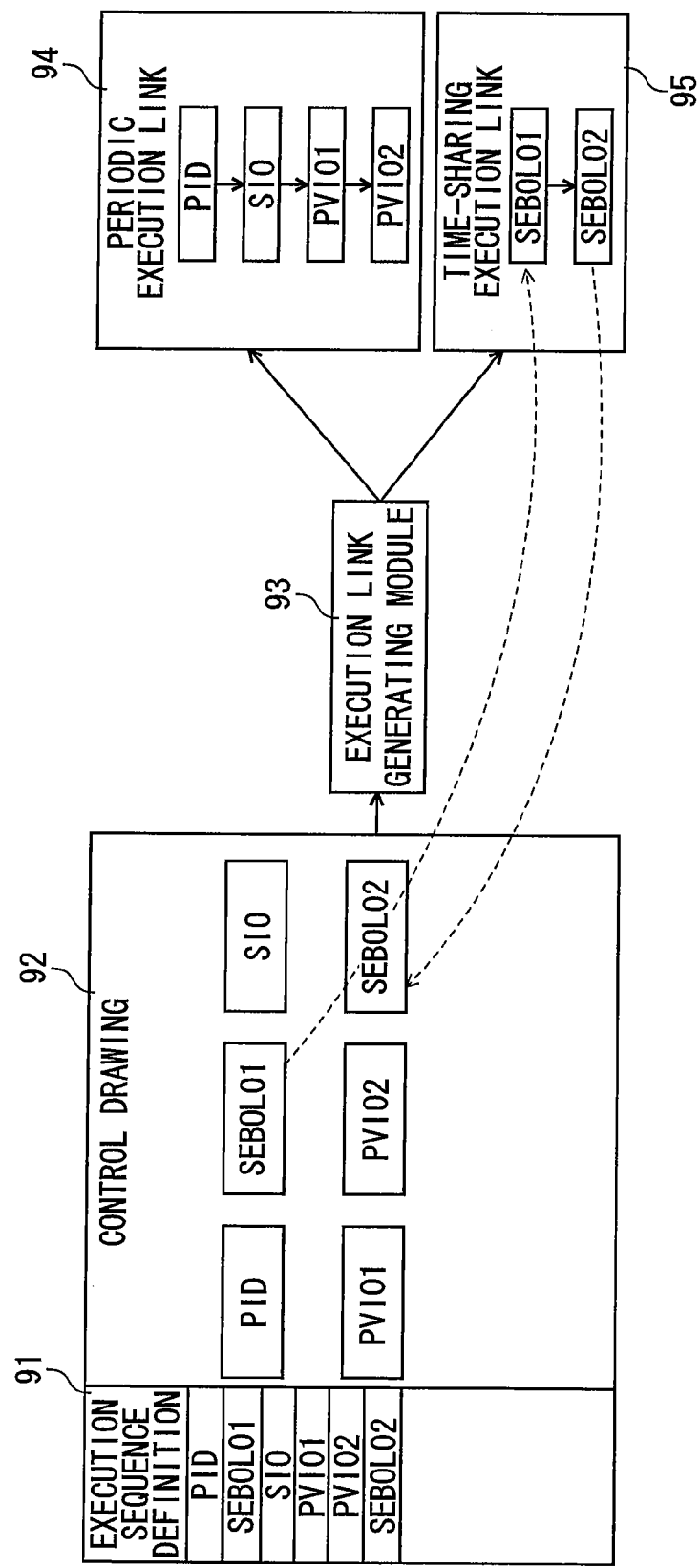
FIG. 8 is a functional block diagram for explaining operation of an execution link generating module in a sequence controller according to the related art.

FIG. 2 is a functional block diagram for explaining operation of an execution link generating module in the sequence controller according to the embodiment of the invention. The difference of the operation of the execution link generating module from operation according to the related art shown in FIG. 8 will be described. An engineer writes order of execution of regular processing function blocks (PID, SIO, PVI01, PVI02) and SEBOL function blocks (SWEBOL(P), SEBOL(T)) on an execution sequence definition screen 91'.

Here, the SEBOL function block SEBOL(P) is an SEBOL function block which will be called from the irregular processing function block storage 35 and executed by the periodic execution type sequence control module 300. The SEBOL function block SEBOL(T) is an SEBOL function block which will be called from the irregular processing function block storage 35 and executed by a time-sharing execution type sequence control module 34 in the same manner as in the related art.

Componentized function blocks are selected from a component palette (not shown) or the like and pasted on a control drawing screen 92' so that the componentized function blocks can be written in order of execution to thereby configure a sequence.

The engineer delivers the contents written on the control drawing screen 92' to an execution link generating module 93' so that the execution link generating module 93' processes the contents to thereby generate a periodic execution link 94' and a time-sharing execution link 95'. In the periodic execution link 94', order of execution of function blocks (PID, SEBOL(P), SIO, PVI01, PVI02) as a mixture of regular processing function blocks and an SEBOL function block to be processed by the periodic execution type sequence control module 300 is prescribed. In the time-sharing execution link 95', order of execution of an SEBOL function block (SEBOL(T)) to be processed by the time-sharing execution type sequence control module 34 is prescribed.

With respect to an SEBOL function block which will be called from the irregular processing function block storage 35 and executed by the periodic execution type sequence control module 300, a user registers the SEBOL function block identified/written as SEBOL(P) on the execution sequence definition screen 91' and the control drawing screen 92', so that the execution link generating module 93' registers the SEBOL function block in the periodic execution link 94'.

Because the periodic execution type sequence control module 300 cannot execute any SEBOL function block directly, the periodic execution type sequence control module 300 calls the SEBOL function block from the irregular processing function block storage 35 and executes the SEBOL function block when the SEBOL function block appears in the execution link of the high speed, middle speed and basic control periods.

Figure 3:
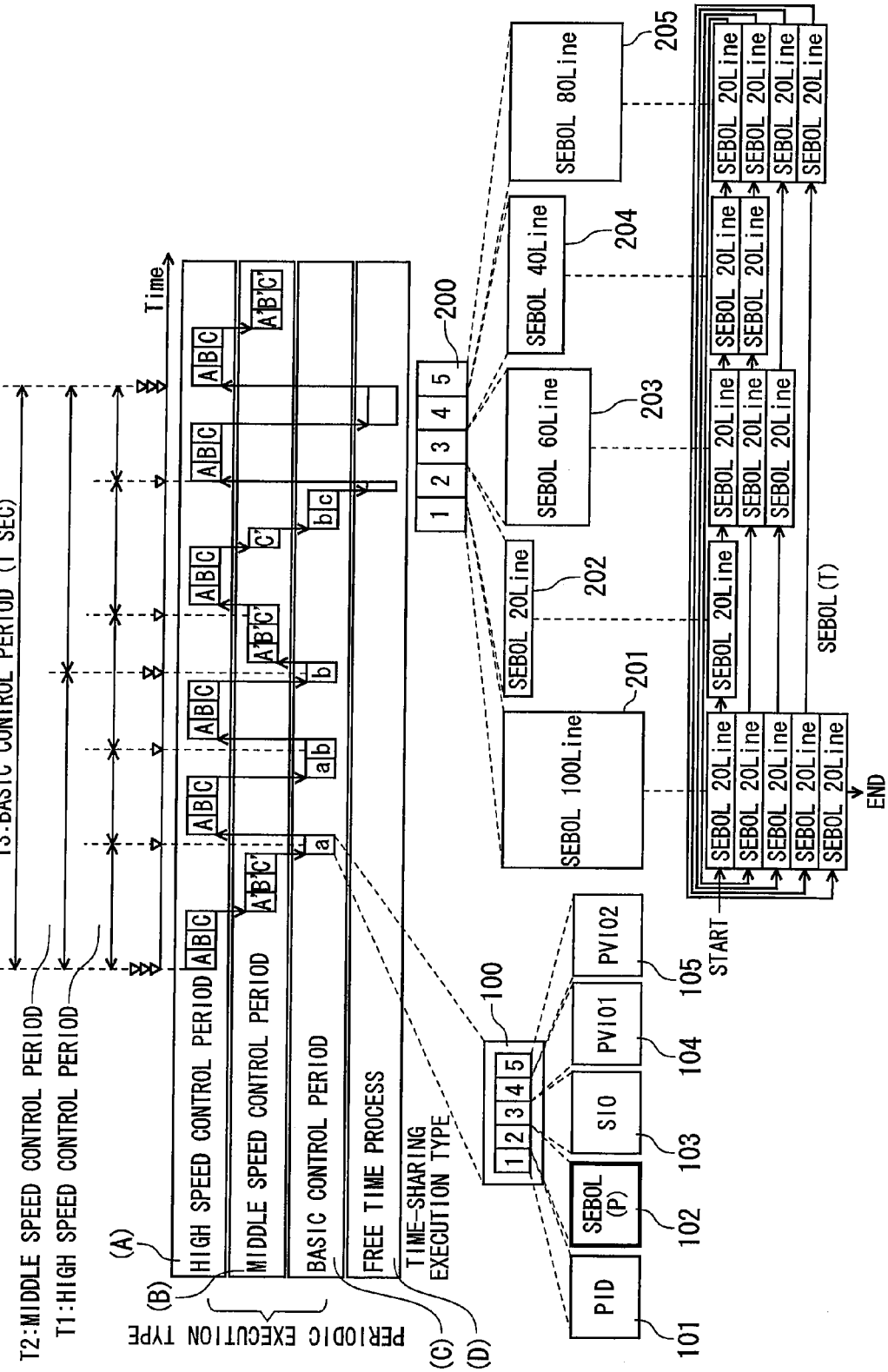
FIG. 3 is a time chart for explaining a flow of sequence processing executed by the sequence controller according to the embodiment of the invention.

FIG. 3 is a time chart for explaining a flow of sequence processing executed by the sequence controller according to the embodiment of the invention. A control drawing 100 of a regular processing function block a to be executed in the basic control period T3 is composed of function blocks 101 to 105 in the same manner as in the background-art configuration shown in FIG. 9. The difference of FIG. 3 from the related art lies in that the function block 102 is an SEBOL function block SEBOL(P).

Although the SEBOL function block substantially has the same operation in the case where the SEBOL function block is processed by the periodic execution type sequence control module 300 and in the case where the SEBOL function block is processed by the time-sharing execution type sequence control module 34, processing of the SEBOL function block is different in the following point.

Processing of the SEBOL function block (SEBOL(P)) operating in each of the high speed, middle speed and basic control periods is not interrupted according to units of SEBOL 20 lines but continued to the last. However, when there appears an instruction statement which means interruption because of processing timing of a higher-priority control period, access to an external device and the programming language, the processing of the SEBOL function block (SEBOL(P)) is interrupted.

Interruption is performed in a boundary between adjacent units of SEBOL 20 lines. With respect to interruption due to the higher-priority control period, the processing of the interrupted SEBOL function block is restarted in the same period after completion of execution for the higher-priority control period.

Although processing of the SEBOL function block according to the related art is interrupted regardless of the contents written in the programming language when there is no time left in the basic control period, there is a possibility that the periodic execution type SEBOL to be executed by the periodic execution type sequence control module 300 may have an infinite loop generated according to the contents written in the programming language to thereby make the processing endless because the periodic execution type SEBOL has such a specification that processing is continued to the last even if there is no time left in the basic control period.

Statement processing which may be conceived as a factor of generation of an infinite loop in the periodic execution type SEBOL is processing (while, repeat, for) of repeating under a specific condition and processing (goto) of jumping to a designated address.

As for these statement processes, the periodic execution type SEBOL therefore has such a specification that processing (while, repeat, for) of repeating is limited to one loop in the basic control period and that processing (goto) of jumping to a designated address is formed so that processing for the basic period is interrupted when jumping to a forward address is performed. Consequently, an infinite loop can be avoided in the periodic execution type SEBOL.

Figure 4:
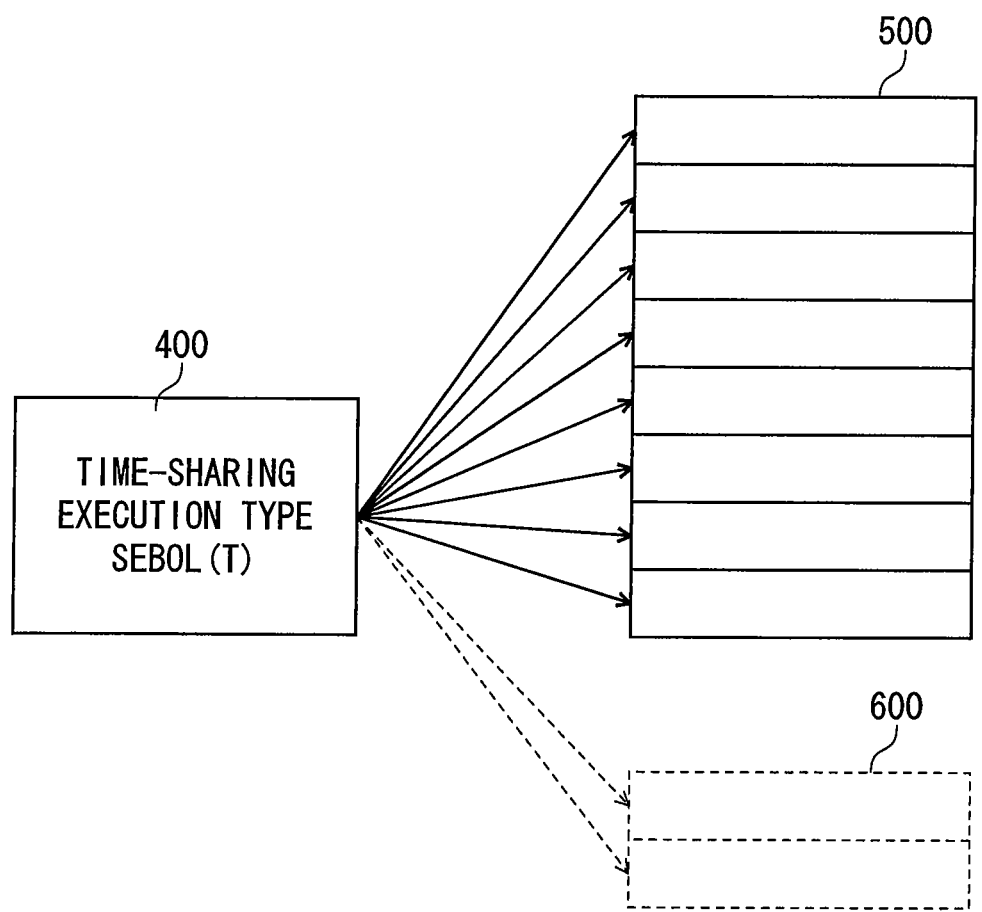
FIG. 4 is a functional block diagram showing general configuration of a buffer provided in the time-sharing execution type SEBOL.

FIG. 4 is a functional block diagram showing general configuration of a buffer provided in the time-sharing execution type SEBOL. An SEBOL function block 400 which is generated in a free time processing according to the related art for accessing an external device is stopped until a response to the request is received. While the SEBOL function block 400 is waiting for a response from the device, the buffer 500 is used for holding the access request so that this processing is reserved and processing of another SEBOL function block is executed.

The buffer has such a specification that the buffer is released when there is a response to the request. Because the number of buffers is finite, the buffer overflows when the buffer takes a long time for receiving the response or when the request to the external device is issued more frequently than the buffer size. The overflowing request is stored in a queue 600. When the buffer full state is improved in accordance with the response from the external device, a process of transferring the overflowing request from the queue 600 to the buffer 500 is performed.

Figure 5:
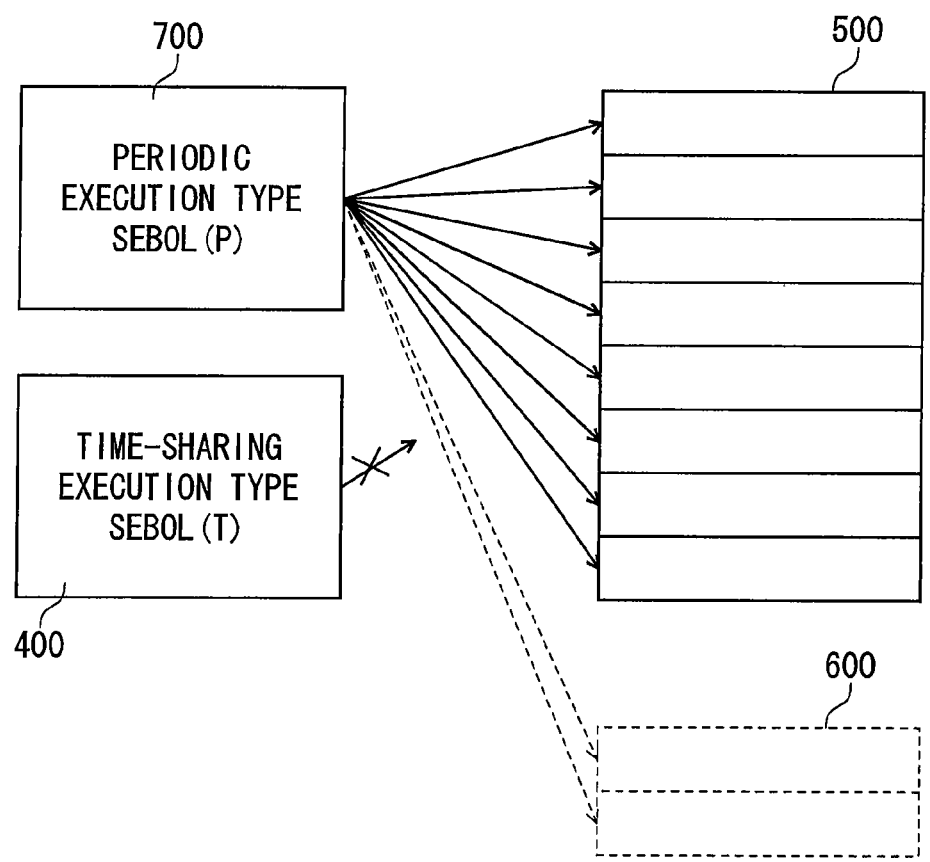
FIG. 5 is a functional block diagram for explaining buffer contention between the time-sharing execution type SEBOL and the periodic execution type SEBOL.

FIG. 5 is a functional block diagram for explaining buffer contention between the time-sharing execution type SEBOL and the periodic execution type SEBOL. This is an issue in the invention in the case where the periodic execution type SEBOL operating in each of the high sped, middle speed and basic control periods is added.

Although there is no problem in the time-sharing execution type SEBOL 400 in which the buffer 500 and the queue 600 are managed in accordance with a single program as shown in FIG. 4, processing earlier in processing timing, for example, periodic execution type SEBOL 700 occupies the whole of the buffer 500 when one buffer is managed in accordance with two programs of the periodic execution type SEBOL 700 and the time-sharing execution type SEBOL 400.

As a result, there is a possibility that processing of the time-sharing execution type SEBOL 400 may not be performed at all. Accordingly, there is a possibility that an extreme difference in processing performance will be generated between the periodic execution type SEBOL 700 and the time-sharing execution type SEBOL 400.

Figure 6:
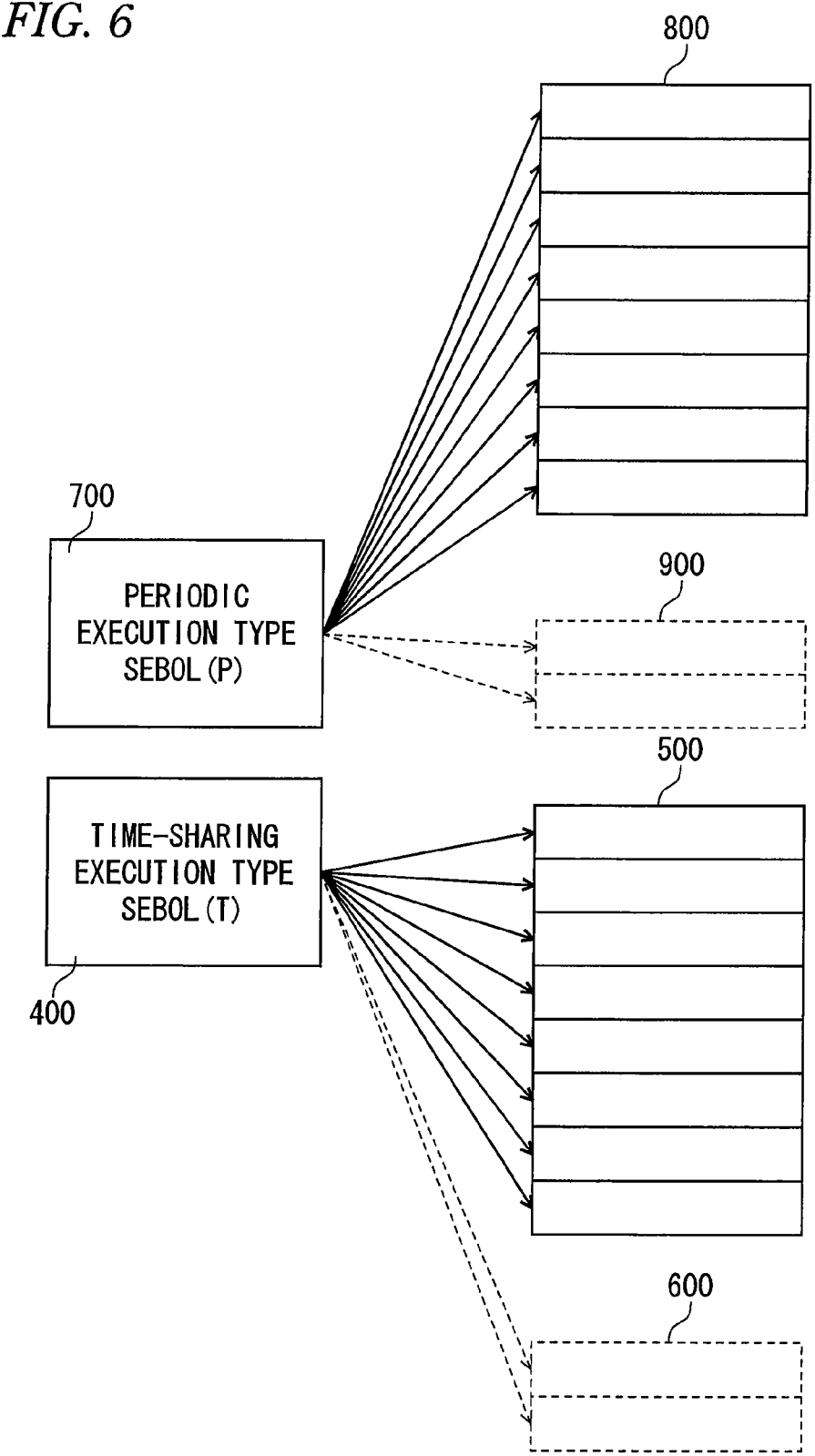
FIG. 6 is a functional block diagram showing buffer configurations of time-sharing execution type SEBOL and periodic execution type SEBOL without buffer contention.

FIG. 6 is a functional block diagram showing buffer configurations of time-sharing execution type SEBOL and periodic execution type SEBOL without buffer contention. FIG. 6 is the same in basic configuration and operation as in the related art but is characterized in that a buffer 800 and a queue 900 exclusive to the periodic execution type SEBOL 700 are provided independently in addition to the buffer 500 and the queue 600 exclusive to the time-sharing execution type SEBOL 400.

The time-sharing execution type SEBOL 400 transmits/receives a request using the buffer 500 and the queue 600 for time-sharing execution type SEBOL. The periodic execution type SEBOL 700 transmits/receives a request using the buffer 800 and the queue 900 for periodic execution type SEBOL.

Because the time-sharing execution type SEBOL and the periodic execution type SEBOL have exclusive buffers and queues respectively as described above, requests from one side of the time-sharing execution type SEBOL and the periodic execution type SEBOL can be prevented from occupying all the buffers. Accordingly, it is possible to solve the problem that a difference in processing efficiency is generated between the time-sharing execution type SEBOL and the periodic execution type SEBOL.

While certain embodiments have been described, these embodiments have been presented by way of example only, and are not intended to limit the scope of the invention. Indeed, the novel system described herein may be embodied in a variety of other forms; furthermore, various omissions, substitutions and changes in the form of the system, described herein may be made without departing from the sprit of the invention. The accompanying claims and their equivalents are intended to cover such forms or modifications as would fall within the scope and sprit of the invention.

What is claimed is:

1. A sequence controller comprising:
a memory configured to hold a plurality of irregular processing function blocks; and
a processor configured with:
a periodic execution type sequence control module that executes periodically a regular processing function block in a predetermined control period; and
a time-sharing execution type sequence control module that executes at least one of the plurality of irregular processing function blocks called from the memory by time-sharing in a free time of the control period in-between a time the processor executes periodically,
wherein the periodic execution type sequence control module is configured to call at least another one of the plurality of irregular processing function blocks from the memory and to execute periodically the at least another one irregular processing function block in the control period,
wherein the irregular processing function block called and executed by the periodic execution type sequence control module in the control period is formed so that repeated processing of the irregular processing function block is limited to one loop in the predetermined control period, and
wherein the irregular processing function block called and executed by the periodic execution type sequence control module in the control period continues until completion even when there is no time left in the predetermined control period.

2. The sequence controller according to claim 1, wherein the processor is configured to perform execution in at least one of the basic control period, a middle speed control period and a high speed control period, the middle speed control period and the high speed control period being more rapid than the basic control period.

3. The sequence controller according to claim 1, wherein
the irregular processing function block is executed in accordance with each program unit having a predetermined number of lines, and
switching from the irregular processing function block called and executed by the processor in the control period to the regular processing function block is executed after completion of processing of the last line of the program unit.

4. The sequence controller according to claim 1, wherein the irregular processing function block called and executed by the periodic execution type sequence control module in the control period is formed so that processing of the irregular processing function block is interrupted in the predetermined control period when processing of jumping to a forward designated address is performed.

5. The sequence controller according to claim 1, wherein each of the irregular processing function blocks includes batch control.

6. The sequence controller according to claim 1, wherein each of the irregular processing function blocks is a SEBOL (Sequence and Batch Oriented Language) function block.

7. The sequence controller according to claim 1, wherein a remaining portion of the at least one of the plurality of irregular processing function blocks is continued for execution in another free time of the control period in-between the time the processor executes periodically when the at least one of the plurality of irregular processing function blocks did not complete execution.

8. The sequence controller according to claim 7,
wherein the free time is a time obtained by subtracting a time necessary for executing the regular processing function block and the at least another one irregular processing function block by the periodic execution type sequence control module from one unit of the predetermined control period, and
wherein the another free time is the time obtained by subtracting the time necessary for executing the regular processing function block and the at least another one irregular processing function block by the periodic execution type sequence control module from another one unit of the predetermined control period.

9. The sequence controller according to claim 1, wherein the time-sharing execution type sequence control module does not execute the at least one of the plurality of irregular processing function blocks within one unit of the predetermined control period if there is no free time within the one unit of the predetermined control period, and executes the at least one of the plurality of irregular processing function blocks within another unit of the predetermined control period.

10. A sequence controller comprising:
a memory configured to hold a plurality of irregular processing function blocks; and
a processor configured with:
a periodic execution type sequence control module that executes periodically a regular processing function block in a predetermined control period; and
a time-sharing execution type sequence control module that executes at least one of the plurality of irregular processing function blocks called from the memory by time-sharing in a free time of the control period in-between a time the processor executes periodically,
wherein the plurality of irregular processing function blocks include time-sharing execution type irregular processing function blocks to be executed by the time-sharing execution type sequence control module, and a periodic execution type irregular processing function block to be used when periodically determined processing is performed,
wherein the processor is further configured with an execution link generating module that generates a periodic execution link and a time-sharing execution link, the periodic execution link defining an execution order of only the regular processing function block and the periodic execution type irregular processing function block to be executed only by the periodic execution type sequence control module, the time-sharing execution link defining an execution order of only the time-sharing execution type irregular processing function blocks to be executed only by the time-sharing execution type sequence control module,
wherein the periodic execution type sequence control module is configured to execute sequence control based on the periodic execution link,
wherein the irregular processing function block called and executed by the periodic execution type sequence control module in the control period is formed so that repeated processing of the irregular processing function block is limited to one loop in the predetermined control period, and
wherein the irregular processing function block called and executed by the periodic execution type sequence control module in the control period continues until completion even when there is no time left in the predetermined control period.

11. The sequence controller according to claim 10, wherein the processor is configured to perform execution in at least one of the basic control period, a middle speed control period and a high speed control period, the middle speed control period and the high speed control period being more rapid than the basic control period.

12. The sequence controller according to claim 10, wherein
the irregular processing function block is executed in accordance with each program unit having a predetermined number of lines, and
switching from the irregular processing function block called and executed by the processor in the control period to the regular processing function block is executed after completion of processing of the last line of the program unit.

13. The sequence controller according to claim 10, wherein the irregular processing function block called and executed by the periodic execution type sequence control module in the control period is formed so that processing of the irregular processing function block is interrupted in the predetermined control period when processing of jumping to a forward designated address is performed.

14. The sequence controller according to claim 10, wherein each of the irregular processing function blocks includes batch control.

15. The sequence controller according to claim 10, wherein each of the irregular processing function blocks is a SEBOL (Sequence and Batch Oriented Language) function block.

16. The sequence controller according to claim 10, wherein all the function blocks identified in the periodic execution link are executed within one unit of the predetermined control period.

17. The sequence controller according to claim 10, wherein a remaining portion of the at least one of the plurality of irregular processing function blocks is continued for execution in another free time of the control period in-between the time the processor executes periodically when the at least one of the plurality of irregular processing function blocks did not complete execution.

18. The sequence controller according to claim 17,
wherein the free time is a time obtained by subtracting a time necessary for executing the regular processing function block and the at least another one irregular processing function block by the periodic execution type sequence control module from one unit of the predetermined control period, and wherein the another free time is the time obtained by subtracting the time necessary for executing the regular processing function block and the at least another one irregular processing function block by the periodic execution type sequence control module from another one unit of the predetermined control period.

19. The sequence controller according to claim 10, wherein the time-sharing execution type sequence control module does not execute the at least one of the plurality of irregular processing function blocks within one unit of the predetermined control period when there is no free time within the one unit of the predetermined control period, and executes the at least one of the plurality of irregular processing function blocks within another unit of the predetermined control period.

* * * * *